United States Patent [19]

Yano et al.

[11] Patent Number: 4,977,040
[45] Date of Patent: Dec. 11, 1990

[54] MAGNETIC CARD

[75] Inventors: Norio Yano; Ginya Ishiguro, both of Yokosuka, Japan

[73] Assignee: Nippon Telegraph and Telephone Corporation, Tokyo, Japan

[21] Appl. No.: 213,469

[22] Filed: Jun. 29, 1988

Related U.S. Application Data

[63] Continuation of Ser. No. 12,550, Feb. 19, 1987, abandoned.

[30] Foreign Application Priority Data

Feb. 17, 1986 [JP] Japan .................................. 61-33490

[51] Int. Cl.⁵ .............................................. G11B 23/00
[52] U.S. Cl. ...................................... 428/692; 283/82; 283/94; 360/131; 428/694; 428/900
[58] Field of Search ................ 428/694, 900; 360/131, 360/135; 427/131, 7; 283/82, 85, 94

[56] References Cited

U.S. PATENT DOCUMENTS

| | | | |
|---|---|---|---|
| 2,643,130 | 6/1953 | Kornei | 360/131 |
| 3,219,353 | 11/1965 | Prentky | 360/131 |
| 3,256,483 | 6/1966 | Broadbent | 360/131 |
| 3,808,404 | 4/1974 | Riggs | 360/131 |
| 4,410,583 | 10/1983 | Hanaoka | 428/694 |
| 4,544,574 | 10/1985 | Itami et al. | 427/131 |
| 4,555,444 | 11/1985 | Hanaoka | 427/131 |
| 4,624,883 | 11/1986 | Yamaguchi et al. | 427/131 |
| 4,624,894 | 11/1986 | Kishimoto | 427/131 |
| 4,687,231 | 8/1987 | Hartmann | 283/82 |

FOREIGN PATENT DOCUMENTS

| | | | |
|---|---|---|---|
| 51-129209 | 5/1975 | Japan . | |
| 53-89000 | 8/1978 | Japan | 360/131 |
| 55-93514 | 7/1980 | Japan . | |
| 60-219635 | 11/1985 | Japan . | |
| 60-219636 | 11/1985 | Japan . | |

Primary Examiner—Paul J. Thibodeau
Attorney, Agent, or Firm—Frishauf, Holtz, Goodman & Woodward

[57] ABSTRACT

In the subject magnetic card, first magnetic recording layer 2 is laid over substrate 1. First magnetic recording layer 2 has a coercive force that enables magnetic recording of data. Second magnetic recording layer 4, having a coercive force smaller than that of first magnetic recording layer 2, is laid over first magnetic recording layer 2, with shielding intermediate layer 3 interposed therebetween. Magnetic shielding layer 5 is provided as an uppermost magnetic layer.

13 Claims, 4 Drawing Sheets

MAGNETIC CARD

This application is a continuation of application Ser. No. 07/012,550, filed Feb. 9, 1987 now abandoned.

BACKGROUND OF THE INVENTION

The present invention relates to a magnetic card having a plurality of stacked magnetic layers on which information is recorded in distribution, and a magnetic shielding layer which is located uppermost and used for shielding information.

In the prior art, a magnetic card of the multi-layer structure type is well known, as disclosed in Japanese Patent Disclosure (Kokai) No. 51-129209. FIG. 1 shows a magnetic card of this type. As shown, substrate 1 is overlaid with first magnetic layer 2, which is in turn overlaid with non-magnetic intermediate layer 30. Second magnetic layer 4 is laid over non-magnetic intermediate layer 30, and protection layer 50 is provided as an uppermost layer such that it covers the upper side of second magnetic layer 4. This laminated structure is employed so as to prevent the magnetic card from being forged or to prevent the information recorded on the card from being altered. Authentic data is recorded on first magnetic layer 2, while counterfeit data is recorded on second magnetic layer 4. Non-magnetic intermediate layer 30 is formed of $\alpha$-$Fe_2O_3$, for example. Uppermost protection layer 50 is formed of a synthetic resin, for example.

It is recently found, however, that the counterfeit data recorded in second magnetic layer 4 can be easily erased by means of a so-called "paper clip magnet" or the like. If the counterfeit data is erased, the authentic data recorded on first magnetic layer 2 can be easily reproduced for decoding, by use of an ordinary technique. Therefore, it has become difficult to prevent the magnetic card from being fraudulently used by an unauthorized person or to prevent the information on the card from being forged or altered.

Furthermore, the thickness of non-magnetic intermediate layer 30 causes a spacing loss at the time of reproducing data from first magnetic layer 2. Therefore, the data is not always read out accurately from first magnetic layer 2.

SUMMARY OF THE INVENTION

Accordingly, the object of the present invention is to provide a magnetic card which cannot be fraudulently used by an unauthorized person and the information on which is difficult to forge or alter.

To achieve this object, there is provided a magnetic card comprising a substrate; a plurality of magnetic recording layers which are provided on the substrate and each of which has a coercive force that enables magnetic recording of data, and a magnetic shielding layer stacked at least on the uppermost one of the magnetic recording layers and having such a small coercive force as is unsuitable for magnetic recording.

With the magnetic card of the present invention, it is possible both to distributively record valuable information on different recording layers and to magnetically shield the information, thus reliably preventing fraudulent reproduction or decoding of the information by a third party. Therefore, the magnetic card can be effectively prevented from being forged and the information on the card can be effectively prevented from being altered.

Furthermore, with the magnetic card of the present invention, information is reproduced from a magnetic recording layer by magnetically saturating the magnetic shielding layer, and if necessary, another magnetic recording layer. Therefore, reliable reproduction of information can be carried out without a spacing loss.

DETAILED DESCRIPTION OF THE PREFERRED EMBODIMENTS

A description may now be given of the embodiments of the present invention, with reference to FIGS. 2 through 8.

Figure 1:
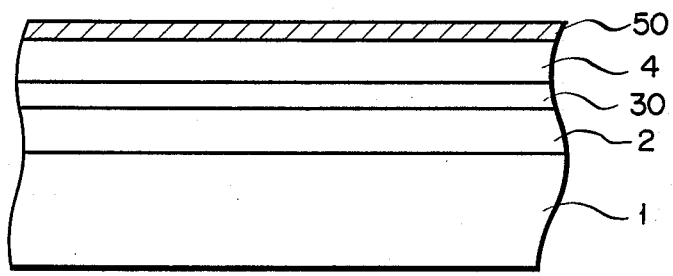
FIG. 1 is a side view illustrating the construction of a conventional magnetic card.
Figure 2:
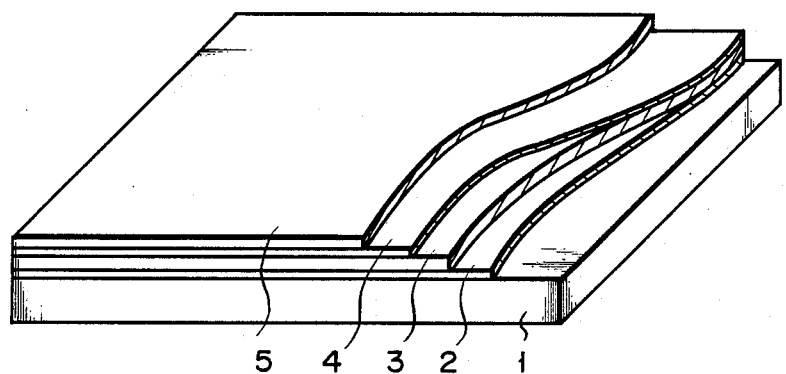
FIG. 2 is a partially-cutaway perspective view illustrating the construction of a magnetic card according to one embodiment of the present invention.

FIG. 2 shows the magnetic card of the first embodiment of the present invention. As shown, the magnetic card comprises: substrate 1; first magnetic recording layer 2 having a coercive force that enables magnetic recording of data; first magnetic shielding layer 3, formed of a soft magnetic material with such a small coercive force as is unsuitable for magnetic recording (e.g., not more than 30 Oersted); second magnetic recording layer 4 having a coercive force that enables magnetic recording of data; and second magnetic shielding layer 5, formed of a soft magnetic material with such a small coercive force as is unsuitable for magnetic recording. The layers are stacked on substrate 1 in the order mentioned, The coercive force of second recording layer 4 is smaller than that of first recording layer 2.

First recording layer 2 is a magnetic layer of cobalt absorbed $\gamma$-$Fe_2O_3$ or Ba ferrite. Second recording layer 4 is a magnetic layer formed of $\gamma$-$Fe_2O_3$, for example. First and second shielding layers 3 and 5 are magnetic layers formed of either a magnetic alloy including Al, Si and Fe, or MnZn.ferrite. Each of these magnetic layers is formed by coating a base layer or substrate 1 with a solution of material magnetic powder. When forming second recording layer 4, cobalt absorbed $\gamma$-$Fe_2O_3$ or Ba ferrite may be used as long as these materials have the coercive force noted above. The shielding layers may be formed of an Fe-Ni alloy.

When using the magnetic card shown in FIG. 2, it is desirable that authentic information is distributively recorded on first and second recording layers 2 and 4 such that the information recorded on first layer 2 and that on second layer 4 will become "authentic" only when they are combined with each other.

A description may now be given of how information is recorded or decoded in actual use of the magnetic card.

Information is recorded as follows. Among pieces of information A which are authentic as a whole, information A1 is recorded on first recording layer 2 by use of a magnetic head which is generating a magnetic field stronger than the coercive force of layer 2. Next, the magnetic field from the magnetic head is controlled such that it is weaker than the coercive force of first recording layer 2 but is stronger than the coercive force of second recording layer 4. In this condition, information A2 (A2=A−A1) is recorded on second recording layer 4.

Figure 3:
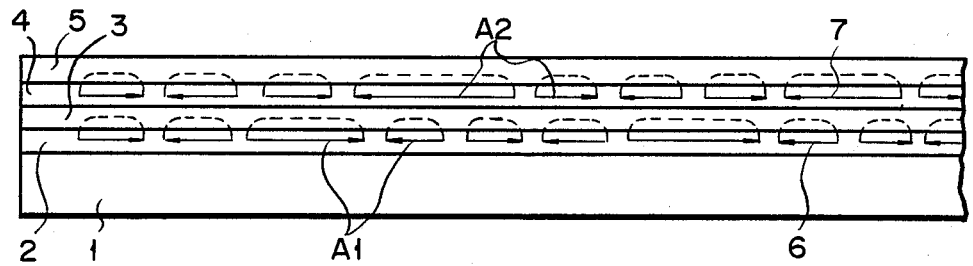
FIG. 3 is a view schematically showing the information recorded on the magnetic card shown in FIG. 2.
Figure 4:
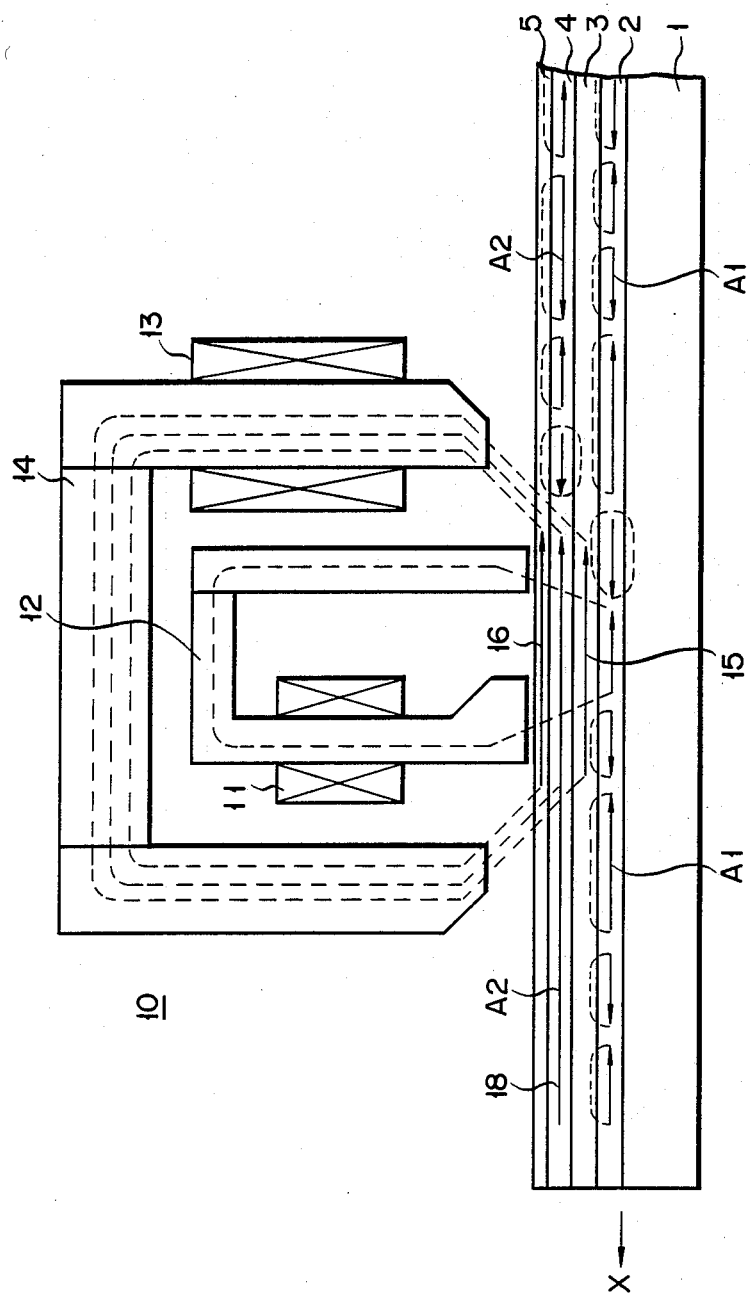
FIG. 4 is a view explaining how information is read out from the magnetic card shown in FIG. 3.

With the magnetic card of the present invention, information is read out as follows: FIG. 3 illustrates the magnetic condition in which information A1 and information A2 are recorded on first and second recording layers 2 and 4, respectively. Solid arrows 6 and 7 indicate the direction of magnetization, and the broken lines indicate the flow of magnetic fluxes. The magnetic fluxes are generated by recording information A1 and A2 on the magnetic recording layers and are shut inside the card by magnetic shielding layers 3 and 5 which have such a small coercive force as is unsuitable for magnetic recording. Information A1 and A2, thus, cannot be read out by a commonly used magnetic head. Information A2, recorded in second recording layer 4, is read out by use of dual-structure magnetic head 10 shown in FIG. 4. As shown, head 10 is comprised of inner yoke 12 provided with coil 11, and outer yoke 14 provided with coil 13. The magnetic card is moved relative to head 10, e.g., in the X direction. At this time, the magnetic field generated from outer yoke 14 is kept stronger than the coercive force of second shielding layer 5 and is weaker than that of second recording layer 4, thus permitting the magnetic characteristics of second shielding layer 5 to be regarded as being identical with those of the air. In other words, second shielding layer 5 is kept in the magnetically saturated condition. Under this condition, information A2 is read out from second recording layer 4 by inner yoke 12.

Thereafter, the magnetic card is moved again relative to head 10, and information A1 is read out from first recording layer 2 by a technique similar to that in which information A2 was read out. The manner in which information A1 is read out will be explained in more detail with reference to FIG. 4. First, the magnetic card is moved in the X direction. At this time, the magnetic field generated by outer yoke 14 is controlled such that it is stronger than the coercive force of second recording layer 4 and is weaker than the coercive force of first recording layer 2. As a result, first and second shielding layers 3 and 5 are magnetized in the directions indicated by arrows 15 and 16, respectively, thereby permitting magnetic fluxes to flow through outer yoke 14. Second recording layer 4 is brought into the condition indicated by arrow 18 after head 10 passes it, so that other magnetic fluxes flow through outer yoke 14. Information A1 is read out from first recording layer 2 by use of inner yoke 12, with first and second shielding layers 3 and 5 and second recording layer 4 magnetically saturated in the manner mentioned above.

In the magnetic card shown in FIG. 2, the upper sides of first and second recording layers 2 and 4 are covered with first and second shielding layers 3 and 5, respectively, thus magnetically shielding first and second recording layers 2 and 4. Therefore, the information recorded on the magnetic card is difficult to reproduce by an ordinary technique (e.g., by use of an ordinary recorder). In the magnetic card, furthermore, the number of recording layers provided is at least two and the coercive force of one recording layer differs from that of another, and information can be distributively recorded on different recording layers. Therefore, the information is considerably difficult to decode or alter, as compared with the information recorded on a conventional magnetic card.

In the foregoing description, the information to be recorded on the magnetic card was described as consisting of information A1 to be recorded on first recording layer 2 and information A2 to be recorded on second recording layer 4. However, the information to be recorded on the magnetic card may be distributed in various manners, e.g., in the following manner:

Information A0 is recorded on first recording layer 2, and two kinds of information, namely information B0 and identification information C0, are recorded on second recording layer 4. Identification information C0 may be function F(A0,B0), which depends on information A0 and information B0. If recorded in this manner, the information can be distributed very effectively. In addition, the function representing identification information C0 is very difficult to decode, so that it is possible both to effectively prevent the card from being forged and to prevent the data on the card from being altered.

Figure 5:
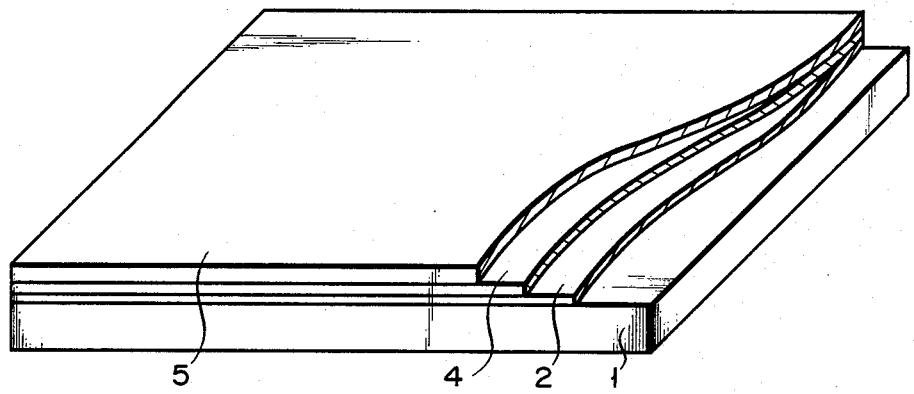
FIG. 5 is a view illustrating the construction of a magnetic card according to another embodiment of the present invention.

FIG. 5 shows a magnetic card according to another embodiment of the present invention. The construction of this magnetic card is substantially the same as that shown FIG. 2, except in that first shielding layer 3 is not provided. In FIG. 5, the same reference numerals as those in FIG. 2 are used to indicate the corresponding structural elements. With the magnetic card of FIG. 5, information is recorded or read out in a manner similar to that described with reference to FIG. 2. When information A2 is read out from second recording layer 4 in the embodiment of FIG. 5, however, it may happen that magnetic fluxes 20 will leak from first recording layer 2 and flow into inner yoke 12, resulting in the occurrence of noise. It is, therefore, desirable that a noise-removing filter is provided in a reproduction circuit. In addition, in order to prevent the noise, the location at which information A2 is recorded on second recording layer 4 may be determined such that information A2 is not influenced by magnetic fluxes which may be generated by information A1 recorded on first recording layer 2.

In this second embodiment, the recorded information is very difficult to decode or alter, as in the first embodiment shown in FIG. 2.

Figure 7:
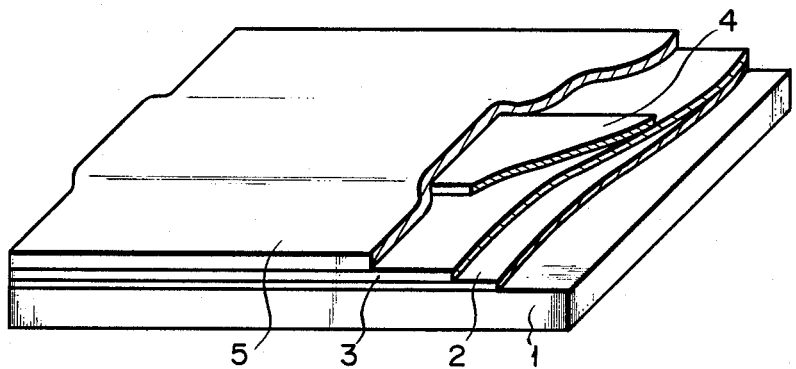
FIG. 7 is a perspective view illustrating the construction of a magnetic card according to still another embodiment of the present invention.

FIG. 7 shows the third embodiment of the present invention. In this embodiment, second recording layer 4 shown in FIG. 2 is not formed on the entire area of first shielding layer 3. It is formed on a selected part of first shielding layer 3 in a stripe pattern. Information is written or read out in a manner similar to that of FIG. 2. Part of information A2 to be recorded on second recording layer 4 can be distributively recorded on that part of first recording layer 2 which is not covered by the second recording layer 4.

Figure 8:
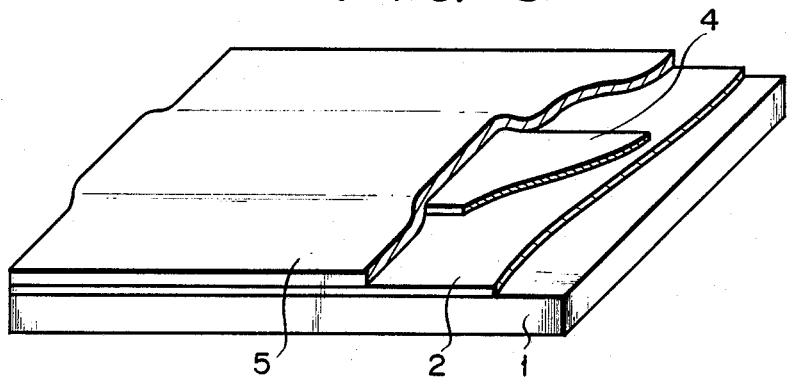
FIG. 8 is a perspective view illustrating the construction of still another embodiment of the present invention.
Figure 6:
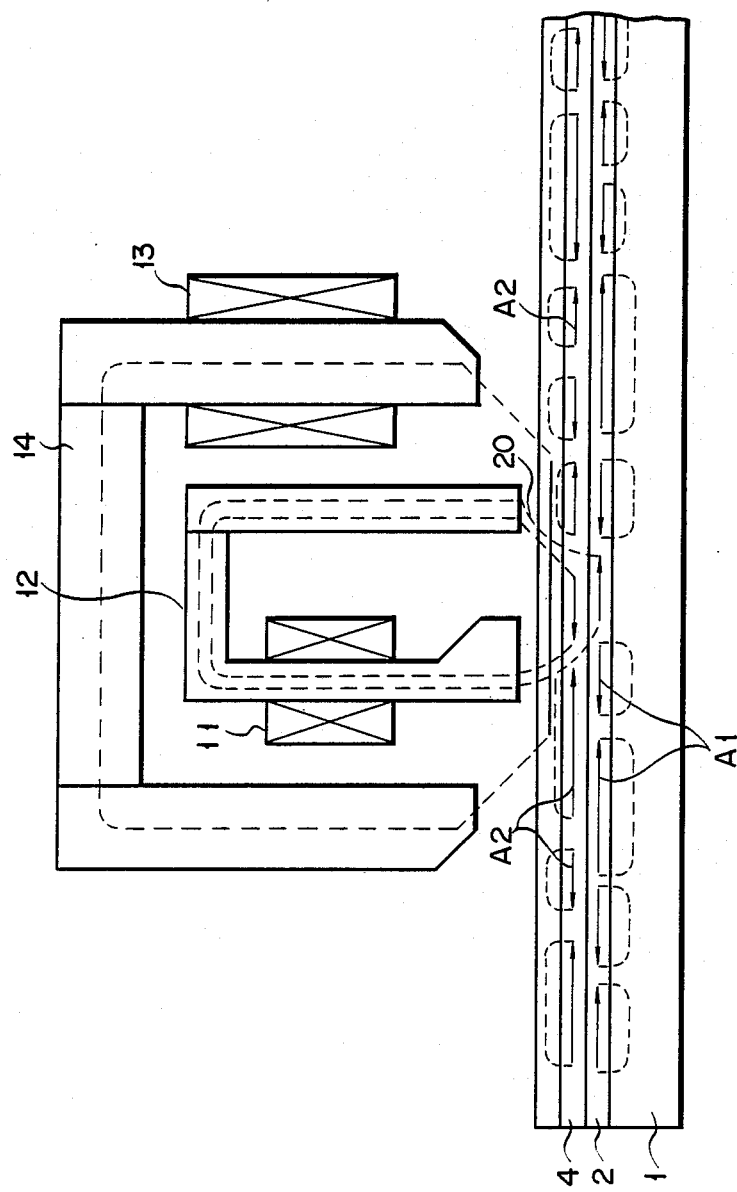
FIG. 6 is a view explaining how information is read out from the magnetic card shown in FIG. 5.

Like the embodiment of FIG. 5, first shielding layer 3 may be omitted from the embodiment of FIG. 7, as shown in FIG. 8. In FIG. 8, the same reference numerals as those in FIG. 5 are used, and explanation of FIG. 8 will be omitted.

The above description was given of the case where the number of recording layers is two. However, this number does not limit the invention. Any number of recording layers can be provided as long as the number is not one. With an increase in the number of recording layers, it will become more and more difficult to decode the information recorded on the magnetic card.

The above description was given of the case where authentic information was distributively recorded on different recording layers. However, the authentic information may be recorded in one of the recording layers.

Furthermore, the magnetic material for forming the recording layers is not limited to the ones referred to above. For example, Sr-ferrite may be used, if desired. Still further, a protection layer may be formed on the second shielding layer in each embodiment.

What is claimed is:

1. A magnetic card for storing selected information, comprising:
    a substrate;
    a plurality of stacked magnetic recording layers provided on the substrate, each of the magnetic recording layers having a coercive force that enables magnetic recording and in which a portion of the selected information is stored in accordance with a predetermined relationship such that said respective portions stored in the plurality of magnetic recording layers are combinable to reproduce said selected information; and
    a magnetic shielding layer provided at least on the uppermost magnetic recording layer, the shielding magnetic layer having such a small coercive force as is unsuitable for magnetic recording.

2. A magnetic card according to claim 1, wherein the plurality of magnetic recording layers and the magnetic shielding layer comprise a first magnetic recording layer stacked on the substrate; an intermediate magnetic shielding layer stacked on the first magnetic recording layer; a second magnetic recording layer stacked on the intermediate magnetic shielding layer and having a smaller coercive force than that of the first magnetic recording layer; and a magnetic shielding layer stacked on the second magnetic recording layer.

3. A magnetic card according to claim 1, wherein the plurality of magnetic recording layers and the magnetic shielding layer comprise a first magnetic recording layer stacked on the substrate; a second magnetic recording layer stacked of the first magnetic recording layer and having a smaller coercive force than that of the first magnetic recording layer; and a magnetic shielding layer stacked on the second magnetic recording layer.

4. A magnetic card according to claim 2, wherein the second magnetic recording layer is formed in a stripe pattern, and the magnetic shielding layer is provided such that it covers part of the intermediate magnetic shielding layer and the second magnetic recording layer.

5. A magnetic card according to claim 3, wherein the second magnetic recording layer is formed in a stripe pattern, and the magnetic shielding layer is provided such that it covers part of the first magnetic recording layer and the second magnetic recording layer.

6. A magnetic card according to claim 2, 3, 4 or 5, wherein the first and second magnetic recording layers store said selected information divided into portions, one portion $A_o$ being recorded on the first layer and the other portion $B_o$ being recorded on the second layer, in accordance with a predetermined relationship $C_o$.

7. A magnetic card according to claim 1, 2, 3, 4 or 5, wherein the first magnetic recording layer contains magnetic particles, of one of Ba ferrite and cobalt absorbed $\gamma\text{-Fe}_2\text{O}_3$.

8. A magnetic card according to claim 7, wherein said magnetic particles are $\gamma\text{-Fe}_2\text{O}_3$.

9. A magnetic card according to claim 1, 2, 3, 4 or 5, wherein the magnetic shielding layer contains magnetic particles of one material selected from the group consisting of a magnetic alloy containing Al, Si and Fe, and MnZn.ferrite.

10. A magnetic card according to claim 1, 2, 3, or 5, wherein the magnetic shielding layer is covered with a protection layer.

11. A magnetic card according to claim 6, wherein the first magnetic recording layer contains magnetic particles of one material selected from the group consisting of Ba ferrite and cobalt absorbed $\gamma\text{-Fe}_2\text{O}_3$, the second magnetic recording layer contains magnetic particles of $\gamma\text{-Fe}_2\text{O}_3$ and, the magnetic shielding layer contains magnetic particles of one material selected from the group consisting of a magnetic alloy containing Al, Si and Fe, and MnZn.ferrite.

12. A magnetic card according to claim 11, wherein the magnetic shielding layer is covered with a protection layer.

13. A method for producing a magnetic card storing selected information, comprising the steps of:
    providing a substrate;
    placing a plurality of stacked magnetic recording layers on the substrate, each of the magnetic recording layers having a coercive force that enable magnetic recording;
    storing a portion of the selected information in said plurality of recording layers in accordance with a predetermined relationship such that said respective portions stored in the plurality of magnetic recording layers are combinable to reproduce said selected information; and
    providing a magnetic shielding layer at least on the uppermost magnetic recording layer, the shielding magnetic layer having such a small coercive force as is unsuitable for magnetic recording.

* * * * *